United States Patent [19]
Aoki et al.

[11] Patent Number: 5,697,711
[45] Date of Patent: Dec. 16, 1997

[54] ROLLING BEARING WITH SEALING PLATES

[75] Inventors: Mamoru Aoki; Hironori Suzuki; Shigeki Maehara, all of Kanagawa, Japan

[73] Assignee: NSK Ltd., Tokyo, Japan

[21] Appl. No.: 557,236

[22] Filed: Nov. 14, 1995

[30] Foreign Application Priority Data

Nov. 14, 1994 [JP] Japan .................... HEI. 6-279219

[51] Int. Cl.$^6$ .................................................. F16C 33/76
[52] U.S. Cl. .................................................. 384/484
[58] Field of Search .......................... 384/484, 485, 384/486, 477

[56] References Cited

U.S. PATENT DOCUMENTS

| | | | |
|---|---|---|---|
| 4,526,485 | 7/1985 | Frase et al. | 384/486 |
| 5,333,957 | 8/1994 | Yip et al. | 384/484 |
| 5,383,728 | 1/1995 | Micca et al. | 384/484 X |

FOREIGN PATENT DOCUMENTS

| | | | |
|---|---|---|---|
| A1 0053334 | 11/1981 | European Pat. Off. | |
| 1221175 | 5/1960 | France | 384/484 |
| 1313626 | 11/1962 | France | 384/484 |
| 4304325 | 8/1994 | Germany | 384/486 |
| 62-149622 | 9/1987 | Japan | |
| 1191148 | 5/1970 | United Kingdom | |
| A 2144184 | 2/1985 | United Kingdom | |

*Primary Examiner*—Thomas R. Hannon
*Attorney, Agent, or Firm*—Sughrue, Mion, Zinn, Macpeak & Seas, PLLC

[57] ABSTRACT

In a rolling bearing providing an inner race, an outer race, a plurality of rolling elements and a sealing plate closing an open end between the outer circumference of the inner race and the inner circumference of the outer race, the sealing plate is formed of a synthetic resin in a generally annular shape, the sealing plate including an annular main plate portion and an engaging rim formed along an outer peripheral edge of the main plate portion, the engaging rim having an outwardly opened groove on its lateral side and being deformable elastically in a radial direction of the rolling bearing to engage the engaging groove. Further, the outwardly opened grooved includes a bottom surface which is positioned between a first plane and a second plane that extend outer and inner surfaces of the main plate portion in the radial direction, respectively. The rolling bearing achieves a structure having high sealing performance to prevent the deformation of sealing plate.

12 Claims, 6 Drawing Sheets

ROLLING BEARING WITH SEALING PLATES

BACKGROUND OF THE INVENTION

The present invention relates to a rolling bearing with sealing plates that is employed in a part which supports a rotating shaft of a relatively small-sized machine including business and office equipments such as copiers, acoustic equipments such as tape recorders, and visual equipments such as VTRs.

Rolling bearings are employed in a part which supports a rotating shaft of various machines. In particular, rolling bearings assembled in the part of small-sized machines which supports the rotating shaft, are lubricated with internally packed grease. Therefore, such rolling bearings that form the part for supporting the rotating shaft of small-sized machines must be provided with sealing plates for preventing not only the leakage of grease but also dirt and dust from entering into the rolling bearings. The sealing plates have conventionally been made of metals but in recent years the use of elastic materials such as synthetic resins and rubbers is increasing since they can be mounted easily while providing satisfactory sealing performance. In particular, sealing plates made of synthetic resins are preferably used for economic and durability reasons.

An example of the conventional rolling bearings that are fitted with sealing plates made of synthetic resins may be found in Unexamined Japanese Utility Model Publication No. Sho. 62-149622. FIGS. 7 to 9C show the rolling bearing with sealing plates that is described in the reference. A main body 1 of the rolling bearing includes an inner race 3 having an inner raceway 2 which is formed in the central part of its outer circumference, an outer race 5 having an outer raceway 4 which is formed in the central part of its inner circumference, and a plurality of rolling elements (balls) 6 rotatably provided between the inner raceway 2 and the outer raceway 4. The rolling elements 6 are rotatably held by a cage 7 in such a way that the rolling elements are spaced away from each other in the circumferential direction.

In order to mount sealing plates 8 in the main body 1 of the rolling bearing, a V-shaped engaging groove 9 is formed on the inner circumference at both ends of the outer race 5 in such a way that it extends along the entire circumference of the bearing. The sealing plates 8 are each made of a synthetic resin in a generally annular shape. Each sealing plate includes an annular main plate portion 10 having an engaging rim 11 formed at its outer peripheral edge; the engaging rim 11 has a V-shaped cross section and is capable of elastic deformation in a radial direction. In order to provide a rolling bearing fitted with sealing plates by mounting the plates 8 in the main body 1, the engaging rim 11 is pressed into each of the engaging grooves 9 by the sequence of steps shown in FIGS. 9A, 9B and 9C. After the engaging rim 11 of each sealing plate 8 has been pressed into the engaging groove 9, the two engaging rims 11 urge against the inner surfaces of the engaging grooves 9, allowing the outer peripheral edges of the plates 8 to be supported on the inner circumference at both ends of the outer race 5. In this state, the inner peripheral edges of the main plate portions 10 of the sealing plates 8 are positioned very close to the outer circumferences at both ends of the inner race 3. As a result, there are closed both open ends of a portion that is between the outer circumference of the inner race 3 and the inner circumference of the outer race 5 and where the plurality of rolling elements 6 are placed.

However, the conventional rolling bearing unit which is fitted with sealing plates in the manner just described above have the following problems to be solved.

(1) The sealing plates 8 have a tendency to deform elastically such that their inner peripheral edges depart from the outer circumference of the inner race 3 as shown exaggeratedly by dashed lines in FIG. 10. If such elastic deformation of the sealing plates 8 occurs, a great clearance forms between the inner peripheral edge of each sealing plate 8 and the outer circumference of the inner race 3, so that the sealing performance of the plates 8 deteriorates.

The elastic deformation of the sealing plates 8, which eventually leads to lower sealing performance, is due to occur by the following mechanism. When the engaging rim 11 is deformed elastically in a radial direction until it engages the engaging groove 9 in the inner circumference of the outer race 5, the engaging rim 11 receives an elastic force directed radially inward. The applied elastic force is transmitted to the main plate portion 10 but in the conventional structure shown in FIGS. 7 to 9C, it is applied to a position that departs from the main plate portion 10 in the axial direction (vertical direction in FIGS. 7 to 9C), whereupon the main plate portions 10 easily deform elastically as indicated by dashed lines in FIG. 10.

(2) If the synthetic resin of which the sealing plates 8 are made creeps, then rattling is prone to occur in the area of engagement between the engaging rim 11 and the mating groove 9. This may be explained as follows. Rolling bearings with sealing plates are often exposed to high temperature and as the temperature rises, the sealing plates 8 made of a synthetic resin undergo more thermal expansion than the outer race 5 made of a bearing steel. As a result, the tightening allowance (contact pressure) for the area of engagement between the engaging rim 11 and the engaging groove 9 increases excessively during the temperature elevation. Accordingly upon the increasing tightening allowance, the tensile stress which is primarily applied to that part of the engaging rim 11 which contacts the inner diameter side of the groove bottom can become excessive beyond the creep limit of the synthetic resin of which the sealing plates 8 are made. If an excessive tensile stress is thus exerted on that part of the engaging rim 11 which contacts the inner diameter side of the groove bottom during temperature elevation, and if the engaging rim 11 creeps to deform elastically, rattling occurs in the area of engagement between each engaging rim 11 and the engaging groove 9 when the sealing plates 8 shrink as the temperature decreases. Furthermore, the clearances that have thus formed in the areas of engagement and which can cause rattling lead to deteriorated sealing performance since they provide passageways for leaking grease or entering foreign matter.

SUMMARY OF THE INVENTION

The present invention has been accomplished with a view to providing a rolling bearing with sealing plates that is free from conventional problems.

The rolling bearing of the present invention which is fitted with sealing plates and which provides an inner race having an inner raceway which is formed on its outer circumference, an outer race having an outer raceway which is formed on its inner circumference and an engaging groove which is formed entirely along the inner circumference at an end of the outer race, a plurality of rolling elements rotatably provided between the inner raceway and the outer raceway, and a sealing plate closing an open end between the outer circumference of the inner race and the inner circumference of the outer race, the sealing plate being formed of a synthetic resin in a generally annular shape, the sealing plate including an annular main plate portion and an engaging rim formed along an outer peripheral edge of the main plate portion, the engaging rim having an outward opened groove on its lateral side and being deformable elastically in a radial direction of the rolling bearing to engage the engaging groove. In particular, according to the rolling bearing of the present invention , the outward opened groove includes a bottom surface which is positioned between a first plane and a second plane that extend outer and inner surfaces of the main plate portion in the radial direction, respectively.

In another aspect of the present invention, the rolling bearing fitted with sealing plates and which provides an inner race having an inner raceway which is formed on its outer circumference, an outer race having an outer raceway which is formed on its inner circumference and an engaging groove which is formed entirely along the inner circumference at an end of the outer race, a plurality of rolling elements rotatably provided between the inner raceway and the outer raceway, and a sealing plate closing an open end between the outer circumference of the inner race and the inner circumference of the outer race, the sealing plate being formed of a synthetic resin in a generally annular shape, the sealing plate including an annular main plate portion and an engaging rim formed along an outer peripheral edge of the main plate portion. In particular, according to another aspect of the rolling bearing of the present invention, the engaging rim includes a base end face which is positioned between a first plane and a second plane that extend outer and inner surfaces of the main plate portion in the radial direction, respectively, and an end projection which projects beyond the second plane.

The rolling bearing of the present invention which is fitted with sealing plates has a special feature incorporated in the shape of the engaging rims and this enables the main plate portion of each sealing plate from deforming elastically in a direction that deviates from the outer circumference at either end of the inner race. Stated more specifically, when the engaging rim is allowed to deform elastically in a radial direction in order to bring it into engagement with the engaging groove, a radially inward elastic force develops to be applied from the engaging rim to the main plate portion such that it is exerted on the thick-walled inside area of the main plate portion of each sealing plate. Therefore, the applied elastic force acts only in the direction that reduces the diameter of the main plate portion and there is no likelihood that the main plate portion is deformed elastically by that elastic force to deviate from the outer circumference at either end of the inner race.

Another important effect that results from the special feature added to the shape of the engaging rims is that compression, rather than tension, is the stress that acts predominantly on the engaging rims. Synthetic resins creep more easily under a tensile stress than under a compressive stress. Therefore, the reduction of the tensile stress that acts on the engaging rims renders it more resistant to creep-dominated plastic deformation during use. This eliminates the possibility of rattling in the area of engagement between the engaging rim and the corresponding groove, which would otherwise occur if the temperature of the engaging rims decreased after the development of creep at an elevated temperature.

DETAILED DESCRIPTION OF THE PREFERRED EMBODIMENTS

Figure 1:
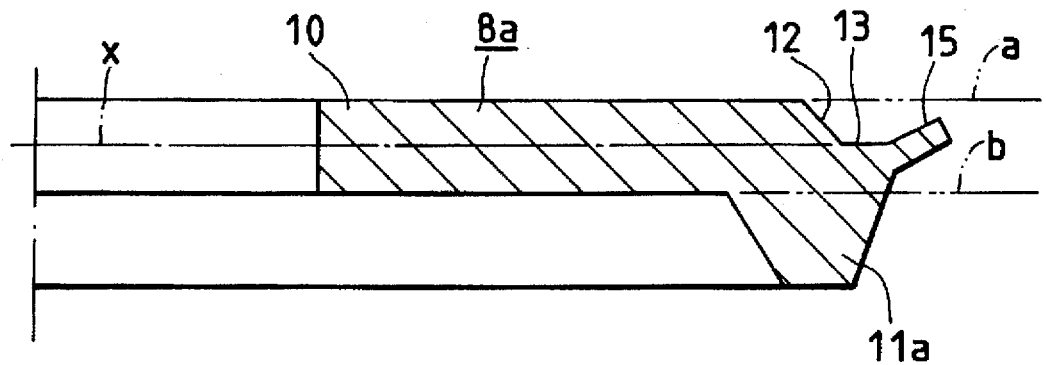
FIG. 1 is a sectional view showing one half of a sealing plate used in a first embodiment of the present invention.
Figure 2:
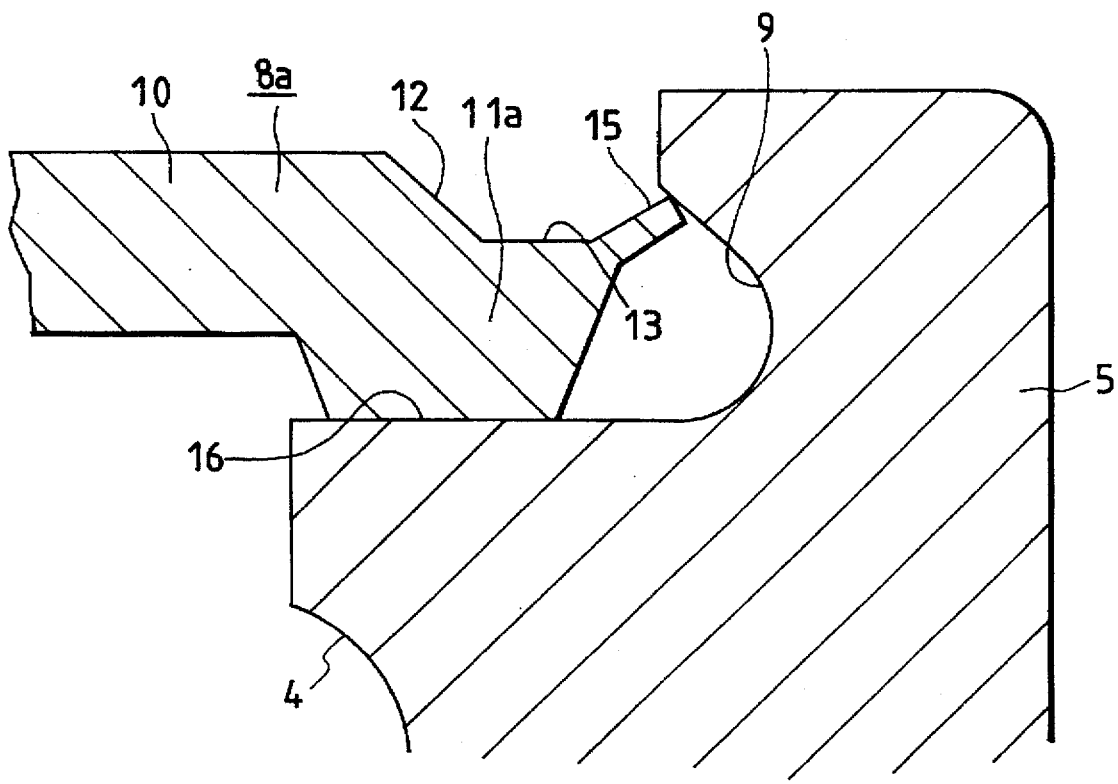
FIG. 2 is a partial sectional view showing the sealing plate as it is mounted on an outer race of a rolling bearing.
Figure 7:
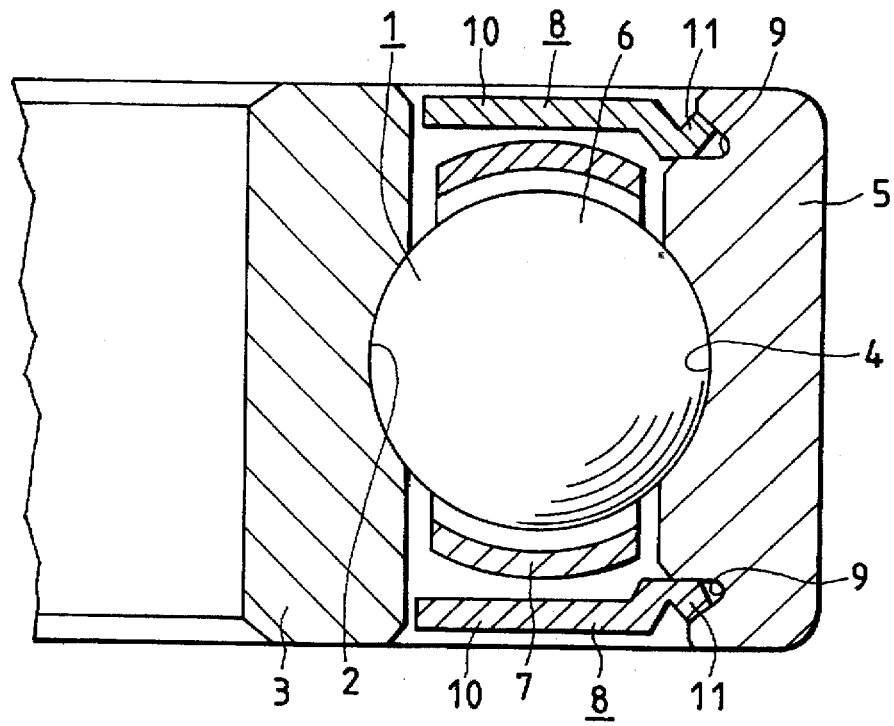
FIG. 7 is a partial section of a conventional rolling bearing fitted with sealing plates.
Figure 8:
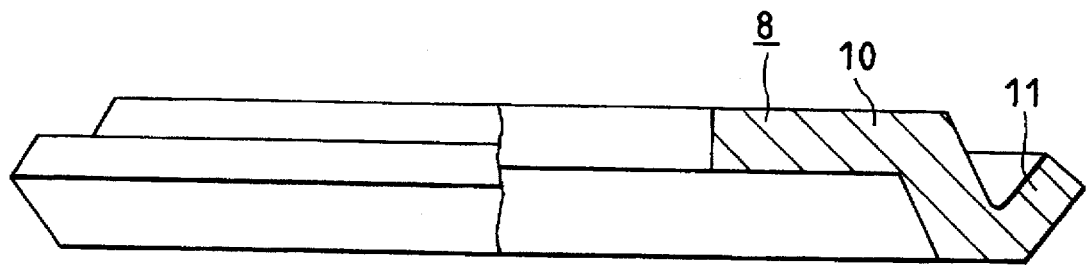
FIG. 8 is a side view showing in partial section a sealing plate for use in a conventional rolling bearing.
Figure 9A:
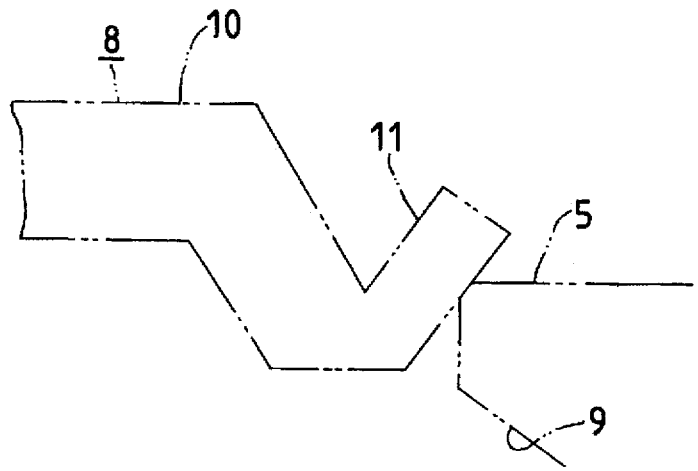
FIGS. 9A, 9B and 9C show in partial section the sequence of steps for mounting a sealing plate on an outer race of the conventional rolling bearing.
Figure 9B:
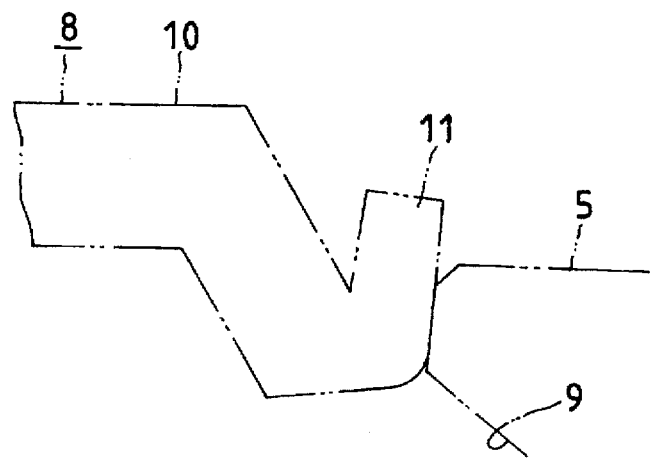
Figure 9C:
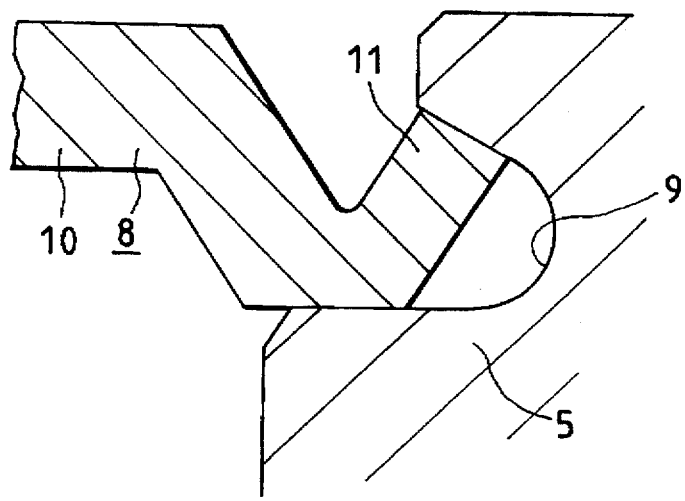
Figure 10:
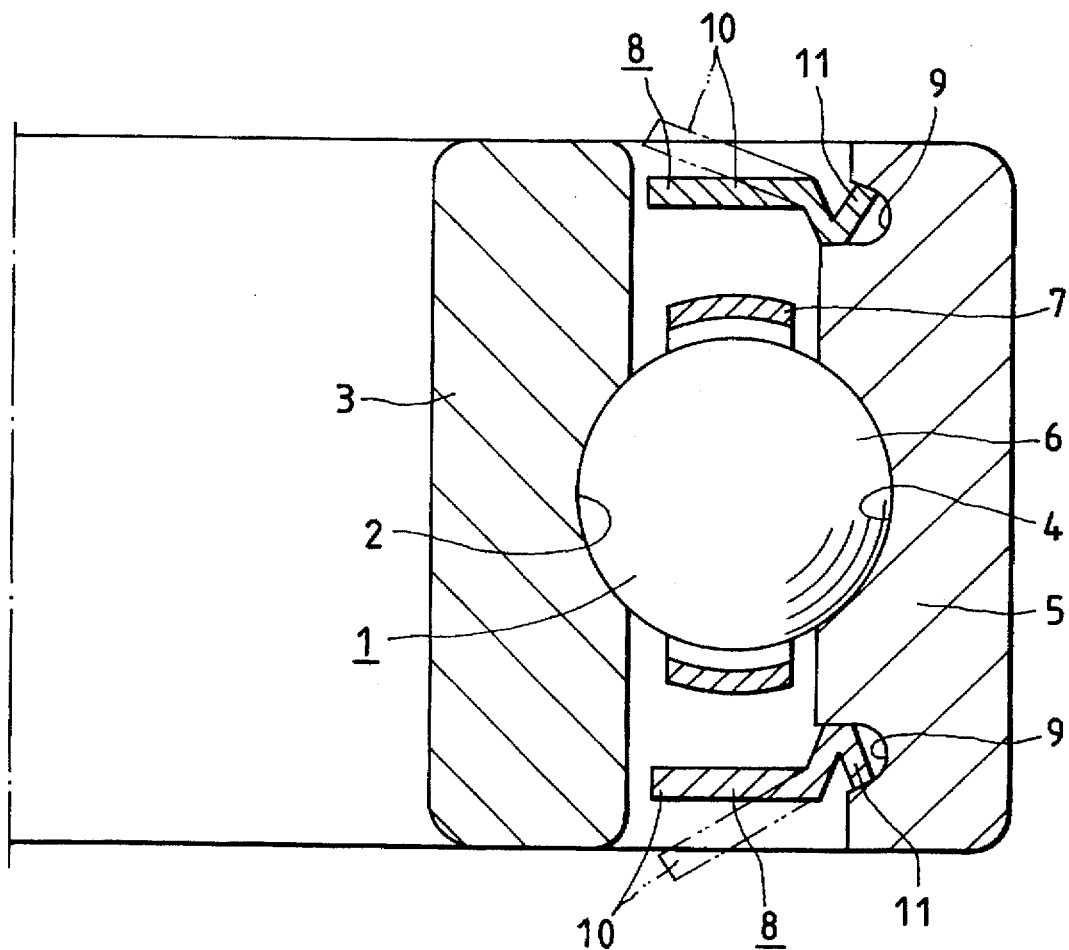
FIG. 10 is a partial section showing how the sealing plates are deformed.

FIGS. 1 and 2 show a first embodiment of the present invention. The main body 1 of the rolling bearing fitted with sealing plates according to the present invention has the same structure as that already described with reference to FIGS. 7 and 10, so in order to avoid any descriptive overlaps, the following description focuses on the shape of sealing plate 8a which is the characterizing portion of the present invention. Like the sealing plates 8 (see FIGS. 7 to 10) assembled in the conventional structure, the sealing plate 8a is made of a synthetic resin in a generally annular form but it has an engaging rim 11a formed along the outer peripheral edge of the annular main plate portion 10 in such a way that it has a groove open on a lateral side and that it is freely deformable in a radial direction. The synthetic resin of which the sealing plate 8a is to be made may be selected from among thermoplastic resins such as polyamides, polyacetals, polybutylene terephthalate and polyallylates, which may be used either on their own or in combination with reinforcing materials such as glass or carbon fibers.

Particularly, in order to provide the engaging rim 11a for the sealing plate 8a of the rolling bearing of the present invention, the bottom surface 13 of the groove 12 which is open on a lateral side and which is formed along the entire part of the outer peripheral edge of the sealing plate 8a is designed to satisfy the positional requirement that the bottom surface 13 be positioned between two imaginary planes a and b, the first imaginary plane a being provided by extending one surface of the main plate portion 10 (which is the upper surface in FIGS. 1 and 2) radially outward to the right of FIG. 1 and the second imaginary plane b being provided by extending the other surface of the main plate portion 10 (which is the lower surface in FIGS. 1 and 2) also radially outward to the right of FIG. 1. Stated in another way, the line x provided by extending the bottom surface 13 radially inward (to the left of FIGS. 1 and 2) is positioned between the opposing surfaces of the main plate portion 10. In the illustrated case, an engaging lip 15 is formed along the outer peripheral edge of the engaging rim 11a and this lip is also positioned between the first and second imaginary planes a and b.

Another feature of the illustrated case is that in order to secure engagement of the engaging rim 11a, the compressive stress that is applied to the outer peripheral edge of the sealing plate 8a during use in accordance with various parameters such as the diameter and cross-sectional shape of the groove 9 formed in the inner circumference at an end of the outer race 5, the outside diameter of the sealing plate 8a, the cross-sectional shape of the engaging rim 11a and the elasticity of the synthetic resin of which the sealing plate 8a is made, is set not to exceed the creep limit of the synthetic resin at the operating temperature. Moreover, specifying the dimensions and shapes of the above-mentioned parts such that the stress that is exerted on the outer peripheral edge of the sealing plate 8a during use is set not to exceed the creep limit of the synthetic resin of which it is made, can easily be accomplished by calculations based on experiments that are performed as required.

The sealing plate 8a constructed in this way has the engaging rim 11a pushed into the engaging groove 9 in the same manner as described for the sealing plate 8 in the aforementioned conventional structure, whereby the engaging rim 11a is brought into engagement with the groove 9 as shown in FIG 2.

The rolling bearing of the present invention which is constructed by bringing the engaging rim 11a of the sealing plate 8a into engagement with the groove 9 in the manner described above offers the advantage that due to the shape of the engaging rim 11a which is defined by the groove 12 and the engaging lip 15, the inner peripheral edge of the main plate portion 10 of the sealing plate 8 can be prevented from deforming elastically in a direction that deviates from the outer circumference at either end of the inner race 3. Stated more specifically, when the engaging rim 11a is allowed to deform elastically in a radial direction in order to bring it into engagement with the groove 9, a radially inward elastic force develops to be applied from the engaging lip 15 at the leading end of the engaging rim 11a to the main plate portion 10 such that it is exerted on the thick-walled inside area of the main plate portion 10 of the sealing plate 8a. Therefore, the elastic force under consideration acts only in the direction that reduces the diameter of the main plate portion 10 and there is little likelihood that the main plate portion 10 is deformed elastically by that elastic force to deviate from the outer circumference at either end of the inner race 3. Further, in order to insure that the main plate portion 10 is prevented from deformation more positively, the bottom surface 13 of the groove 12 which is delineated by the extension x is preferably positioned in the thick-walled central part of the main plate portion 10. Moreover, it is also effective to position the engaging lip 15 between the first and second imaginary planes a and b.

Another important effect that results from the especially designed shape of the engaging rim 11a is that compression, rather than tension, is the stress that acts predominantly on the engaging rim 11a. Synthetic resins creep more easily under a tensile stress than under a compressive stress. Therefore, the reduction of the tensile stress that acts on the engaging rim 11a renders it more resistant to creep-dominated plastic deformation during use. In addition, the compressive stress that is applied to the outer peripheral edge of the sealing plate 8a during use in accordance with various parameters such as the diameter of the engaging groove 9, the outside diameter of the sealing plate 8a, the shape of the engaging rim 11a and the elasticity of the synthetic resin of which the sealing plate 8a is made, is set not to exceed the creep limit of that synthetic resin at the operating temperature. Therefore, no creep would develop in the engaging rim 11a during use. This eliminates the possibility of rattling in the area of engagement between the engaging rim 11a and the mating groove 9, which would otherwise occur if the temperature of the engaging rim 11a decreased after the development of creep at an elevated temperature.

Figure 3:
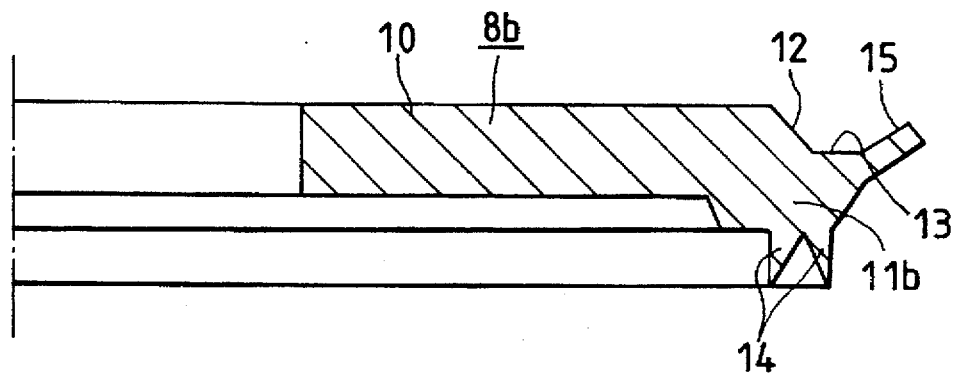
FIG. 3 is a sectional view showing one half of a sealing plate used in a second embodiment of the present invention.
Figure 4:
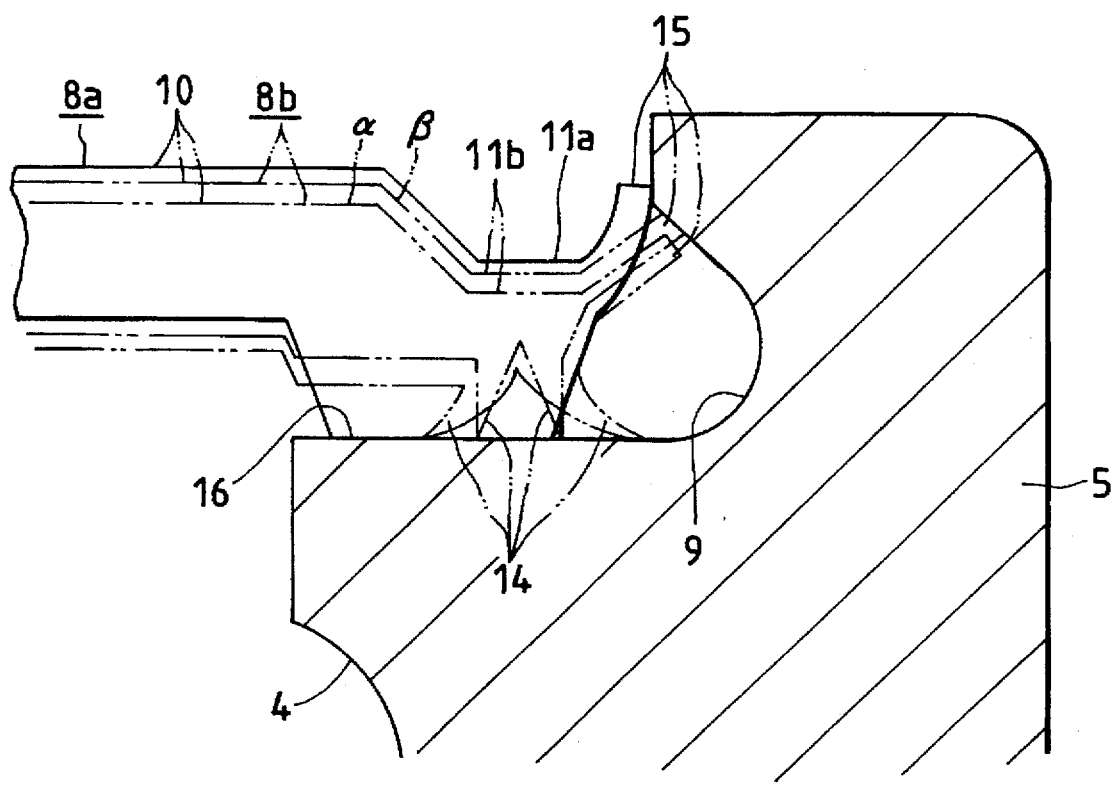
FIG. 4 is a partial sectional view showing the sealing plate, with part of it being unhatched, as it is mounted on an outer race of a rolling bearing.

FIGS. 3 and 4 show a second embodiment of the present invention. In the second embodiment, a plurality of elastic lips 14 are formed on that lateral surface of the engaging rim 11b which is opposite to the surface where the groove 12 is formed and the lips 14 may be provided on the entire circumference or in selected circumferential positions. The elastic lips 14 serve to insure that the engaging rim 11b of the sealing plate 8b and the engaging groove 9 on the inner circumference of the outer race 5 are held in uniform engagement along the entire circumference. Stated more specifically, the engaging rim 11b is brought into engagement with the groove 9 by pressing the rim 11b against a step 16 that is positioned closer to the center in the axial direction than the groove 9. As the result of this pressing step, the engaging rim 11b is adequately displaced toward the step 16 and this is the characterizing portion of the second embodiment.

The engaging rim 11a formed in the first embodiment of the present invention has such great stiffness that it may partly fail to be displaced adequately even it is pressed against the step 16. If the displacement of the engaging rim 11a is insufficient, the engaging lip 15 provided on its outer peripheral edge may sometimes fail to achieve intended engagement with the groove 9 as indicated by a solid line in FIG. 4. Even such partial failure to achieve engagement between the lip 15 and the groove 9 increases the chance of the sealing plate 8a of slipping out of the groove 9 and, hence, is not preferred.

In the second embodiment, however, the presence of the elastic lips 14 guarantees adequate displacement of the engaging rim 11b toward the step 16. Therefore, the engaging lip 15 and the groove 9 can be brought into uniform engagement along the entire circumference. This may be explained more specifically as follows. In order to bring the engaging rim 11b, which is a component of the sealing plate 8b according to the second embodiment, into engagement with the groove 9, the elastic lips 14 are elastically deformed so that the engaging rim 11b comes adequately close to the step 16, as indicated by a dashed line α in FIG. 4. If the engaging rim 11b is brought adequately close to the step 16, the engaging lip 15 of the rim 11b positively enters into the groove 9 along the entire circumference. With the engaging lip 15 having thusly advanced into the groove 9 along the entire circumference, if the force which is pressing the engaging rim 11b against the step 16 is removed, then due to the elasticity of the elastic lips 14, the engaging rim 11b advances away from the step 16 as indicated by a dashed line β in FIG. 4. Subsequently, the edge of the leading end of the engaging lip 15 engages the inner surface of the groove 9 along the entire circumference. As a result, the sealing plate 8b can be ensured positively against slipping out of the outer race 5. Therefore, care must be taken in the second embodiment to ensure that no stress exceeding the creep limit of the synthetic resin of which the sealing plate 8b is made would be exerted on the elastic lips 14. Besides the formation of the elastic lips 14, the second embodiment of the present invention has the same structural and operational features as the already-described first embodiment.

Figure 5:
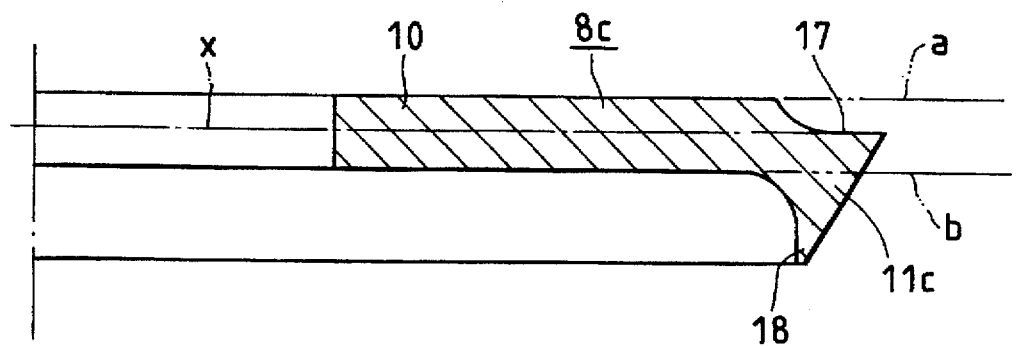
FIG. 5 is a sectional view showing one half of a sealing plate used in a third embodiment of the present invention.
Figure 6:
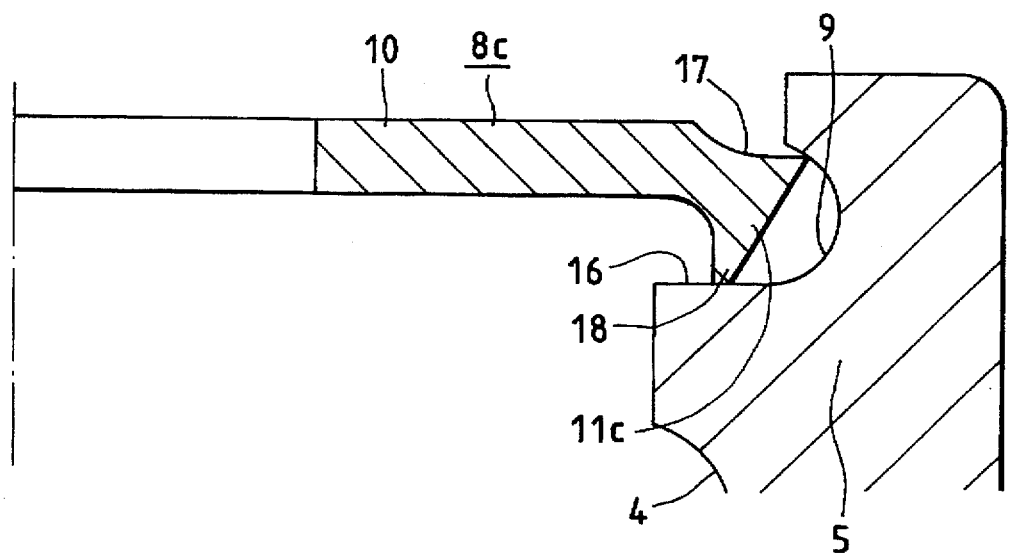
FIG. 6 is a sectional view showing one half of the sealing plate as it is mounted on an outer race of a rolling bearing.

FIGS. 5 and 6 show a third embodiment of the present invention. The sealing plate 8c according to this embodiment includes an annular main plate portion 10 and an engaging rim 11c having a generally triangular cross section that is formed on the outer peripheral edge of the main plate portion 10. This engaging rim 11c is brought into engagement with the groove 9 on the inner circumference at either end of the outer race 5, and the inner peripheral edge of the main plate portion 10 is brought very close to the outer circumference at either end of the inner race 3 (see FIG. 7), thereby closing the opening at either end of the area containing a plurality of rolling elements 6 (see FIG. 7).

The main plate portion 10 has a step formed on the outer peripheral edge of one of its surfaces and the basal end face 17 of the engaging rim 11c which also serves as the bottom surface of that step is located between two imaginary planes a and b; the first imaginary plane a is provided by extending the one surface of the main plate portion 10 radially outward and the second imaginary plane b is provided by extending the other surface of the main plate portion 10 also radially outward. The leading end 18 of the engaging rim 11c projects beyond the other surface of the main plate portion 10 (i.e., positioned farther away from the first imaginary plane a than the second imaginary plane b).

With the sealing plate 8c having the thusly shaped engaging rim 11c, the rim deforms elastically by a smaller amount than in the above-described first and second embodiments and, therefore, there is then need to regulate the dimensional precision very strictly in order to prevent the occurrence of defects such as cracking and plastic deformation. However, the third embodiment is as effective as the other embodiments in preventing the deformation of the main plate portion 10 and the creeping of the synthetic resin of which the sealing plate 8c is made.

Having the construction described above and operating in the manner already described above, the rolling bearing of the present invention which is fitted with sealing plates ensures the intended sealing performance of the sealing plates and is free from the problem of rattling in the area of supporting them. Hence, the following advantages are attained:

(1) The leakage of grease and the entering of foreign matter such as dirt and dust are positively prevented, so satisfactory durability can be assured for the main body of the rolling bearing; and (2) In the absence of the rattling of the sealing plates, no vibrations develop and hence the deterioration in the performance of machines having a rotation supporting area which would otherwise occur due to the rattling of the sealing plates can be effectively prevented.

What is claimed is:

1. A rolling bearing with a sealing plate, comprising:

an inner race having an inner raceway which is formed on its outer circumference;

an outer race having an outer raceway which is formed on its inner circumference and an engaging groove which is formed entirely along the inner circumference at an end of the outer race;

a plurality of rolling elements rotatably provided between the inner raceway and the outer raceway; and a sealing plate closing an open end between the outer circumference of the inner race and the inner circumference of the outer race, the sealing plate being formed of a synthetic resin in a generally annular shape, the sealing plate comprising an annular main plate portion and an engaging rim formed along an outer peripheral edge of the main plate portion, the engaging rim including a recess having a bottom surface which is positioned between a first plane and a second plane that extend outer and inner surfaces of the main plate portion in a radial direction of the rolling bearing, respectively, the recess being opened outwardly in an axial direction of the rolling bearing, wherein the engaging rim includes a projecting end which projects beyond the second plane so as to be positioned farther away from said first plane than said second plane and which is deformable elastically in the radial direction.

2. The rolling bearing of claim 1, wherein the synthetic resin comprises thermoplastic resin selected from the group consisting of polyamide, polyacetal, polybutylene terephthalate, polyallylate, and a mixture which combines one of polyamide, polyacetal, polybutylene terephthalate and polyallylate with a reinforcing material of glass or carbon fibers.

3. The rolling bearing of claim 1, wherein the sealing plate has such dimensions that a compressive stress which is applied to an outer peripheral edge of the sealing plate does not exceed an creep limit of the synthetic resin at an operating temperature.

4. The rolling bearing of claim 1, wherein the bottom surface comprises a base end face which is positioned in a thick-walled central part of the main plate portion.

5. The rolling bearing of claim 1, wherein the main plate portion includes an inner peripheral edge which is close to the outer circumference of the inner race.

6. The rolling bearing of claim 1, wherein said recess comprises an outward opened groove on its lateral side and being deformable elastically in a radial direction of the rolling bearing to engage the engaging groove.

7. The rolling bearing of claim 5, wherein the engaging rim includes an engaging lip which is formed along an outer peripheral edge of the engaging rim and is positioned between the first plane and the second plane.

8. The rolling bearing of claim 5, wherein the synthetic resin comprises thermoplastic resin selected from the group consisting of polyamide, polyacetal, polybutylene terephthalate, polyallylate, and a mixture which combines one of polyamide, polyacetal, polybutylene terephthalate and polyallylate with a reinforcing material of glass or carbon fibers.

9. The rolling bearing of claim 6, wherein the sealing plate has such dimensions that a compressive stress which is applied to an outer peripheral edge of the sealing plate does not exceed a creep limit of the synthetic resin at an operating temperature.

10. The rolling bearing of claim 6, wherein the bottom surface is positioned in a thick-walled central part of the main plate portion.

11. The rolling bearing of claim 6, wherein the projecting end includes a pair of elastic lips which are deformed away from each other by a pressing force to the engaging groove.

12. The rolling bearing of claim 6, wherein the main plate portion includes an inner peripheral edge which is close to the outer circumference of the inner race.

* * * * *